United States Patent [19]

Yamada et al.

[11] Patent Number: 5,121,154
[45] Date of Patent: Jun. 9, 1992

[54] AUTOMATIC FOCUSING DEVICE USED FOR A CAMERA

[75] Inventors: Masatoshi Yamada, Okaya; Yoshiharu Narita, Shiojiri, both of Japan

[73] Assignee: Chinon Kabushiki Kaisha, Suwa, Japan

[21] Appl. No.: 591,451

[22] Filed: Oct. 1, 1990

[30] Foreign Application Priority Data

Jan. 17, 1990 [JP] Japan .................. 2-8020

[51] Int. Cl.⁵ .......................................... G03B 13/36
[52] U.S. Cl. ................................................ 354/403
[58] Field of Search ...................... 354/400–409; 358/227; 250/201.2–201.8

[56] References Cited

U.S. PATENT DOCUMENTS

| | | | |
|---|---|---|---|
| 4,255,029 | 3/1981 | Freudenschuss | 354/409 |
| 4,518,242 | 5/1985 | Toyama | 354/403 |
| 4,592,638 | 6/1986 | Kaneda et al. | 354/403 |
| 4,632,532 | 12/1986 | Matsumura et al. | 354/403 |
| 4,771,307 | 9/1988 | Kuno et al. | 354/403 |
| 4,835,561 | 5/1989 | Matsui | 354/403 |
| 4,947,202 | 8/1990 | Kitajima et al. | 354/403 |
| 4,992,817 | 2/1991 | Aoyama et al. | 354/403 |

Primary Examiner—W. B. Perkey
Attorney, Agent, or Firm—Morris Law Firm

[57] ABSTRACT

An automatic focusing device employs an active range finder to establish an initial range to an object. A blur is calculated based on the initial range. If the blur is less than a predetermined value, the active range finder is bypassed in favor of a passive range finder. A focusing drive is responsive to the output of the passive range finder to drive the focus toward zero blur. If the initial range provides a blur calculation exceeding the predetermined value, the focusing drive responds to the active range finder until the calculated blur is reduced to a second predetermined value, at which time the active range finder is bypassed in favor of the passive range finder. Thereafter, the focusing drive responds to the passive range finder.

6 Claims, 4 Drawing Sheets

AUTOMATIC FOCUSING DEVICE USED FOR A CAMERA

BACKGROUND OF THE INVENTION

1. Field of the Invention

The present invention relates to an automatic focusing device used for a camera such as a still camera, a video camera, etc., and more particularly to an automatic focusing device having an active range finding system utilizing triangulation combined with a passive range finding system utilizing an image phase difference detecting method for operating the focusing mechanism according to thus obtained range data.

2. Description of the Prior Art

An example of conventional automatic focus adjusting devices is described in Japanese Laid-Open Patent Publication No. 212912/1988 which discloses a device having an active range finding system utilizing triangulation and a passive range finding system utilizing an image phase difference detecting method for operating the focusing mechanism according to thus obtained range data. When the distance to the object cannot be determined by the passive range finding system, a device according to the said invention adjusts the lens focus to a predetermined extent according to the range data obtained through the active range finding system, and then adjusts it once again by the passive range finding system. In other words, the device measures the distance to the object firstly by the passive range finding system. If an image produced using the passive range finding system contains a large degree of blur, which means focusing by the passive range finding system is difficult, the lens is driven, according to the range data obtained through the active range finding system, to a point where focusing by the passive range finding system is possible. If the image produced by the passive range finding system alone has a small degree of blur, focusing is completed immediately by the passive range finding system.

In case of, for example, a 100 mm telephoto lens, the degree of image blur detectable by the phase difference detecting method does not operate satisfactorily at a focus distances near infinity nor very nearby. With the above procedure, however, it is possible to overcome this inadequacy by using the active range finding method to bring the focus into the vicinity of final focus, and then to use the phase difference detecting method for final focus.

The prior-art technique suffers the drawback that the amount of passive range finding data is tremendous when the degree of blur is large. As a result, range calculation, based on highly blurred images requires a long processing time.

OBJECTS AND SUMMARY OF THE INVENTION

Accordingly, it is an object of the invention to provide a focusing technique which overcomes the drawbacks of the prior art.

It is a further object of the invention to provide an automatic focusing device that actuates the active range finding first, thereby avoiding an excessive increase in the amount passive range measuring data. This reduce the burden on the processing part of the device, used for the passive range measurement, by always bringing the system into at least rough focus before the passive range measurement is required. As a result the reduced measuring time for determining the degree of blur makes quick focusing possible.

An automatic focusing device according to the present invention consists of an active range finding system together with a passive range finding system. The active range finding system utilizes triangulation for determining the distance to an object to be photographed. A light emitting element emits a light beam to the object. A photoelectric converting element receives the light beam reflected by the object. The range is determined by triangulation. The passive range finding system utilizes an image phase difference detecting method for determining the degree of blur by forming a plurality of images of the object arriving along a plurality of different light paths. The passive range finding system detects each of these images by photoelectric converting elements to determine a phase difference between each image. A focusing mechanism drives a focusing lens inside a photographic lens to a position determined by either one or both of the active and passive range finding systems. A movement measuring means measures the distance moved by the focusing lens. A comparing means calculates the actual variance between data of the current position of the focusing lens, which is monitored through its movement, and range data obtained by the active range finding system. The comparing means also determines the relative magnitude between the calculated actual variance and a present degree of blur. A focus operation switching means transfers control of focusing between active and passive range finding systems. The focus operation switching means enables focusing according to the output of the active range finding system when the comparing means judges the actual variance to be greater than the preset degree of blur. On the contrary, the focus operation switching means enables focusing when the actual variance is judged to be smaller than the preset degree of blur by the comparing means. In addition, focusing is performed on the basis of the output of the passive range finding system whenever the focusing mechanism arrives at a position commanded by the active range finding system.

According to the present invention, firstly, the active range finding system is actuated, then, distance to the object measured by the active range finding system is compared with the data of the current position of the lens. The difference is determined between the actual degree of blur and a preset degree of blur. The preset degree of blur is, more precisely, a preset converted value of lens movement. When the comparison indicates that the variance (actual degree of blur) is greater than the preset degree of blur, the lens is moved in the direction where it should focus. When the variance is smaller than the preset degree of blur or when said focusing movement according to the data obtained by the active range finding system is completed, focusing movement takes place according to data obtained from the passive range finding system.

Briefly stated, the present invention provides an automatic focusing device employing an active range finder to establish an initial range to an object. A blur is calculated based on the initial range. If the blur is less than a predetermined value, the active range finder is bypassed in favor of a passive range finder. A focusing drive is responsive to the output of the passive range finder to drive the focus toward zero blur. If the initial range provides a blur calculation exceeding the predetermined value, the focusing drive responds to the active range finder until the calculated blur is reduced to a second predetermined value, at which time the active range finder is bypassed in favor of the passive range finder. Thereafter, the focusing drive responds to the passive range finder.

According to an embodiment of the invention, there is provided an automatic focusing device comprising: an active range finding system, a passive range finding system, a focusing mechanism, the focusing mechanism including means for driving a photographic lens to a focus, means for actuating the active range finding system to produce a first range value, means, responsive to the first range value being between first and second amounts, to actuate the passive range finding system, and to thereafter bypass the active range finding system, means responsive to the first range value being outside the first and second amounts to actuate the focusing mechanism, and means responsive to a relation of the focusing mechanism to the first range value to actuate the passive range finding system and thereafter bypass the active range finding system, and the focusing mechanism being responsive to the passive range finding system whenever the passive range finding system is actuated.

According to a feature of the invention, there is provided a method for focusing a lens comprising: measuring a range with an active range finding system, calculating a blur based on the range, driving a focusing mechanism based on the range in a direction to reduce the blur, if the blur exceeds a predetermined value, transferring range measurement to a passive range finding system if the blur is within the predetermined range, and the step of transferring being performed immediately if the blur is initially within the predetermined range.

According to a further feature of the invention, there is provided an automatic focusing system comprising: first means for measuring a range with an active range finding system, means for calculating a blur based on the range, means for focusing a lens based on the range in a direction to reduce the blur, if the blur exceeds a predetermined value, means for measuring a range with a passive range finding system, means for transferring range measurement from the active range finding system to the passive range finding system if the blur is within the predetermined range, and means for immediately transferring the range measurement if the blur is initially within the predetermined range.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
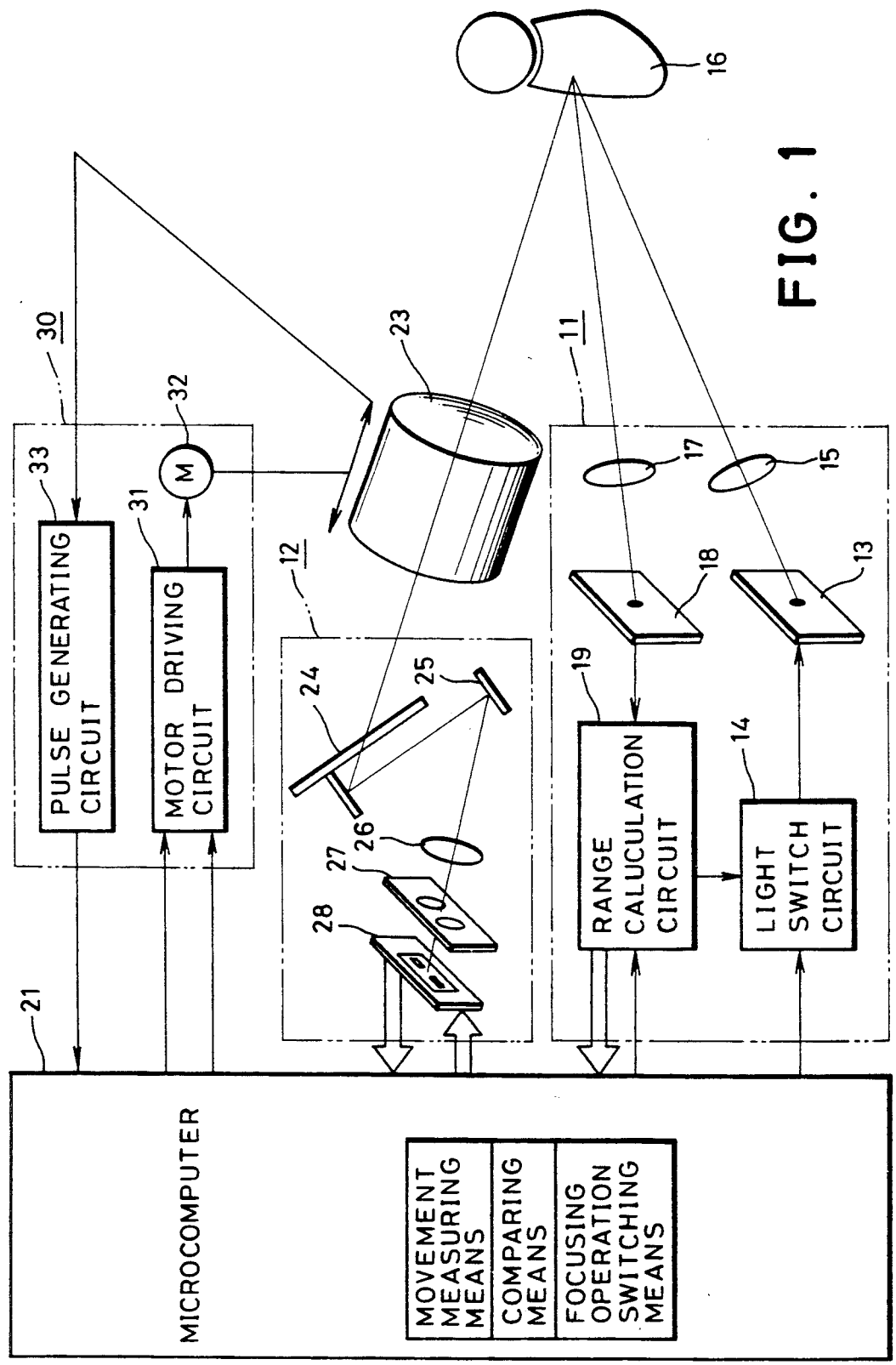
FIG. 1 is a schematic and block diagram showing an embodiment of the automatic focusing device according to the present invention.

Referring to FIG. 1, an overall view shows the entire structure of an automatic focusing device having an active range finding system 11 utilizing triangulation and a passive range finding system 12 utilizing an image phase difference detecting method.

Active range finding system 11 includes a light emitting element 13 actuated by a light switch circuit 14 to emit light beams, such as, for example, infrared rays, through a light emitting lens 15 toward an object 16. A photoelectric converting element 18 receives light reflected from object 16 through a light receiving lens 17.

A photoelectric converting element 18 produces range signals delta 11 and delta 12 for distances to object 16 in accordance with incidence positions of reflected light from object 16. The range signals are applied to a standard range calculation circuit 19. Range calculation circuit 19 feeds the range signals delta 11 and delta 12 into a microcomputer 21 in the form of m-bit digital signals.

Light switch circuit 14 and range calculation circuit 19 performs specified controlling activity in accordance with commands produced by microcomputer 21 with a timing to be described hereinafter.

Passive range finding system 12 conveys images of the object entering through a photographic lens 23, reflects it from a quick return mirror 24 and an auxiliary mirror 25, through a projecting lens 26 to a pair of image focusing lenses 27 and onto a pair of photoelectric converting elements 28.

The degree of blur is detected by comparing the phase difference between the two images on the respective photoelectric converting elements 28 (hereinafter called image sensors).

Image sensors 28 are controlled by commands from microcomputer 21 with a timing to be described hereinafter. The degree of blur is determined by actuation of image sensors 28. In this way, measured range data is input to microcomputer 21.

A focusing mechanism 30 includes a motor driving circuit 31 controlled by range data supplied by microcomputer 21. The range data may be measured by either active range finding system 11 or passive range finding system 12. Motor driving circuit 31 actuates a lens driving motor 32 to move a focusing lens (not shown in FIG. 1) within photographic lens 23 to move toward focussed position. Focusing mechanism 30 includes a pulse generating circuit 33 which produces a number of pulse signals corresponding to a distance which the focusing lens is to be moved.

Figure 2:
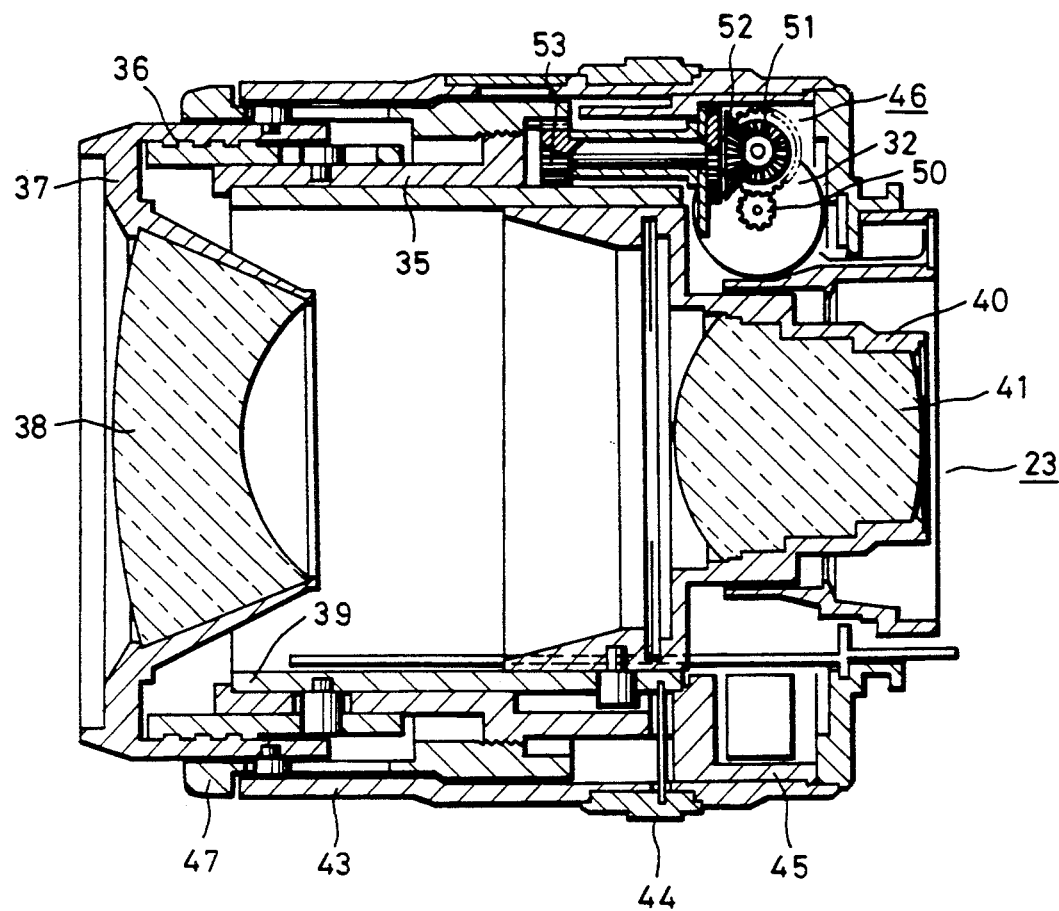
FIG. 2 is a schematic cross section showing a photographic lens useable in the apparatus of FIG. 1.

Referring now to FIG. 2, photographic lens 23 a frame 37 attached to a front part (the left part of the figure) of a fixed cylinder 35 by a helicoid 36. Frame 37 supports multiple lens element 38. A zoom cam cylinder 39 is disposed inside said fixed cylinder 35. Zoom cam cylinder 39 is revolvable in the circumferential direction of cylinder 35.

A rear frame 40, coupled to the rear (at the right of the figure) of zoom cam cylinder 39, supports a multiple lens element 41. Zoom cam cylinder 39 is integrally coupled to a zoom ring 44 revolvably attached around the outer surface of a fixed external cylinder 43. Cam interlocking permits revolving of zoom cam cylinder 39 to control the zooming function by moving multiple lens elements 38 and 41, disposed in said front frame 37 and rear frame 40, forward and backward.

Lens motor 32 is supported on a fixed seat 45 located inside the rear part of fixed external cylinder 43. Lens motor 32 drives a gear mechanism 46 to revolve a range ring 47, which is revolvably disposed inside fixed external cylinder 43. Range ring 47 is integrally coupled with front frame 37. Front frame 37 is rotated on helicoid 36 by rotation of range ring 47, thereby causing focusing.

Figure 3:
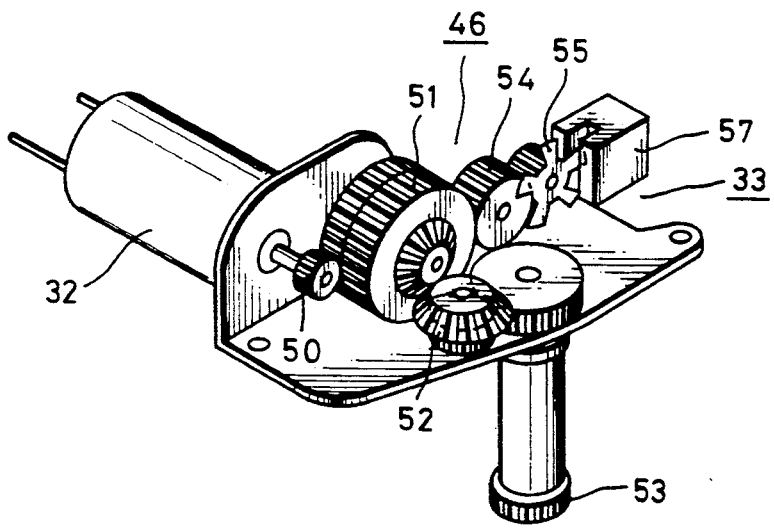
FIG. 3 is a perspective view of the gearing mechanism of the device of FIG. 2.

Referring now to FIG. 3, gear mechanism 46 has a pinion gear 50 integrally formed with the shaft of lens driving motor 32. Pinion gear 50 is in driving relationship with pinion bevel gears 51 and 52 and a pinion gear 53. Pinion bevel gear 53 drives range ring 47 (not shown in FIG. 3).

Pinion bevel gear 51 is also engaged, through an idle pinion 54, to an impeller 55. Impeller 55 includes leaves which pass inside a groove of a photo interrupter 57. Although not shown in the figures, a light emitting element and a light receiving element face each other in the groove of photo interrupter 57 thereby producing a pulse signal whenever a blade of impeller 55 passes therebetween.

Rotation of impeller 55 produces a number of pulses corresponding to the distance through which lenses 38 and 41 are moved. The combination of impeller 55 and photo interrupter 57 comprise the pulse generating circuit 33 of FIG. 1.

Microcomputer 21 counts the number of pulse signals produced by pulse generating circuit 33 to measure the distance over which the elements of photographic lens are moved.

The measurement of distance moved also permits microcomputer 21 to compute the current position of the focusing lens. The current position is used to compute the variance between the computed current position and the position commanded by active range finding system 11.

Microcomputer 21 then compares the computed variance and a preset degree of blur to determine which is greater. In short, microcomputer 21 compares data of the current position of the focusing lens and range data obtained by the active range finding system to compute the variance thereof and to recognize the relative magnitude of the computed variance and the preset degree of blur.

Microcomputer 21 actuates focusing mechanism 30 to respond to range data supplied from active range finding system 11 when the variance between the data of the current position of the focusing lens and the range data from active range finding system 11 is judged to be greater than the preset degree of blur. Conversely, microprocessor actuates focusing mechanism 30 to respond to passive range finding system 12 either on completion of focusing operation based on range data from the active range finding system 11 or when the variance is judged by the comparing means to be smaller than the preset degree of blur.

Figure 4:
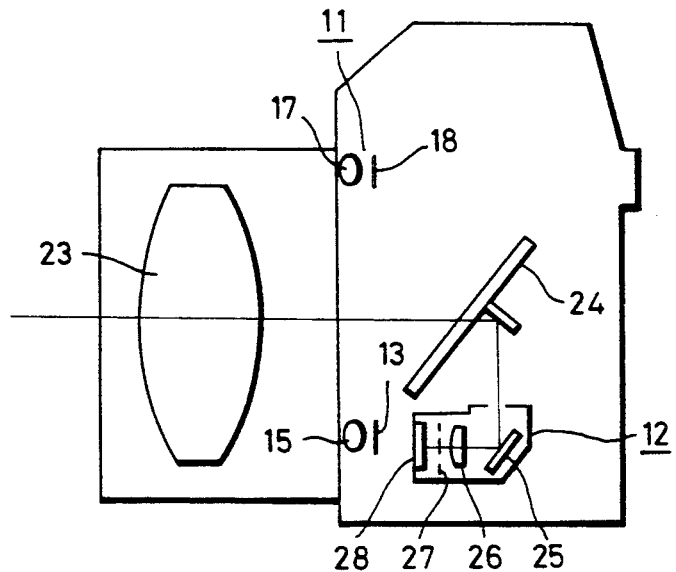
FIG. 4 is a schematic side view of a camera equipped with the device of FIG. 1.

FIG. 4 shows an outline of a configuration where an automatic focusing device having said two range finding systems 11 and 12 is disposed in a camera.

Figure 5A:
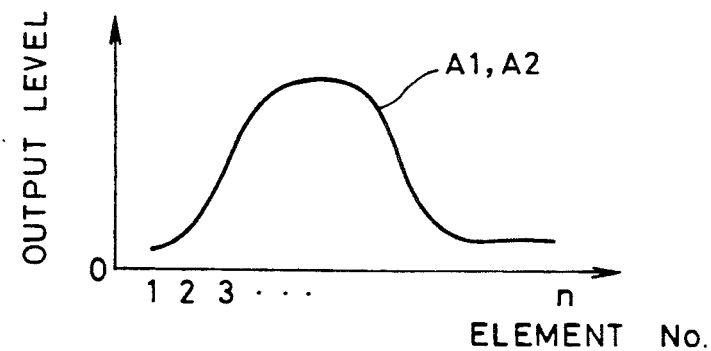
FIGS. 5A and 5B are characteristics diagrams to which reference will be made in explaining the operation of the passive range finding system of the present invention.
Figure 5B:
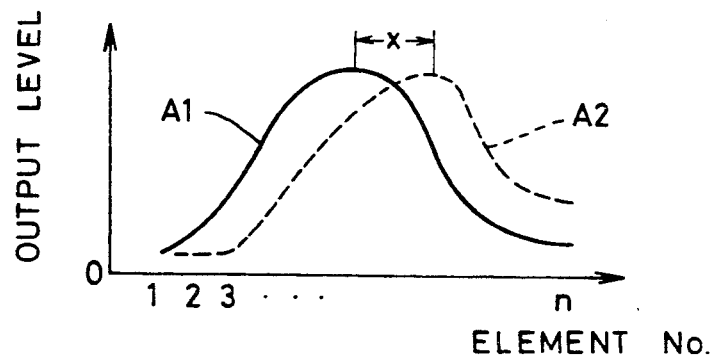

FIGS. 5A and 5B shows the relationship of output signals generated by passive range finding system 12 on the two image sensors 28 shown in FIGS. 1 and 4 under focused and unfocused conditions, respectively. If photographic lens 23 is in a focused state, a phase difference between outputs A1 and A2 of the pair of image sensors 28 is approximately zero, as shown in FIG. 5A. If photographic lens 23 is in the unfocused state, however, as shown in FIG. 5B, a phase difference X exists between outputs A1 and A2 of the pair of image sensors 28. The value of phase difference X is interpreted by microcomputer 21 as measured range.

Figure 6:
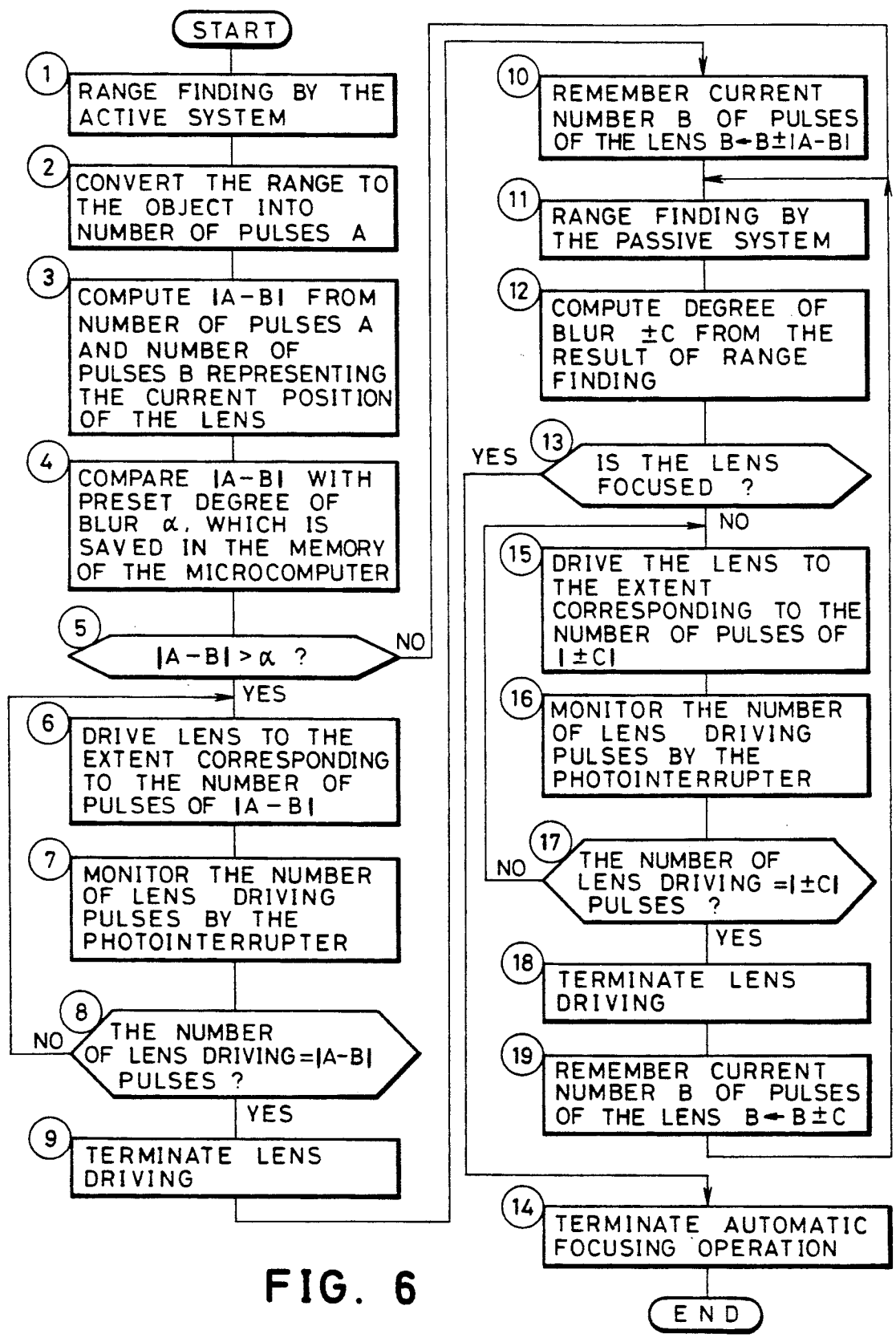
FIG. 6 is a flow chart to which reference will be made in explaining operation of the device of FIG. 1.

Referring now to FIG. 6, the operational of the system is described. First, microcomputer 21 commands active range finding system 11 to measure the distance to the object. Active range finding system 11 performs its range measuring operation (step 1) and outputs m bit of object range data from range calculating circuit. The m bits of range data correspond to the object range. Microcomputer 21 calculates and stores a number of pulses A corresponding to the m bit of object range data (measured range data) (step 2).

Then, microcomputer 21 compares the stored number of pulses A that corresponds to the measured range data and the data of the current position of the focusing lens inside photographic lens 23 (the number of pulses B), and computes variance $|A-B|$ therebetween (step 3).

| | CHART | | |
|---|---|---|---|
| range (m) | number of pulses | active | passive |
| 0.86 | 1592 | 1592 | |
| 0.89 | 1528 | | |
| 0.92 | 1462 | 1462 | ↑ |
| 0.95 | 1396 | | ↑ |
| 0.98 | 1330 | 1330 | ↑ |
| 1.02 | 1266 | | ↑ |
| 1.06 | 1210 | 1210 | ↑ |
| 1.11 | 1144 | | ↑ |
| 1.16 | 1078 | 1078 | ↑ |
| 1.23 | 1012 | | ↑ |
| 1.30 | 948 | 948 | ±500 pulses |
| 1.38 | 882 | | ↓ |
| 1.47 | 816 | 816 | ↓ |
| 1.56 | 760 | | ↓ |
| 1.69 | 694 | 694 | ↓ |
| 1.84 | 630 | | ↓ |
| 2.03 | 564 | 564 | ↓ |
| 2.27 | 498 | | ↓ |
| 2.59 | 432 | 432 | ↓ |
| 2.94 | 376 | | |
| 3.52 | 312 | 312 | |
| 4.40 | 246 | | |
| 5.39 | 198 | 198 | |
| 7.43 | 142 | 198 | |
| 10.0 | 106 | 198 | |
| 20.0 | 52 | 198 | |
| ∞ | 0 | 198 | |

As described above, the position of the focusing lens is monitored through the number of pulses produced by pulse generating circuit 33, the relation between the position of the lens and number of pulses is so adjusted that the number of pulses to be produced when adjusting the lens from the closest focusing distance to infinity shall be 1,600 pulses. The number of pulses A corresponding to measured range data from active range finding system 11 is adjusted to equal the number representing lens location data B, when the distance to the object is same.

For example, referring to the chart, if the distance to the object is 1.3 m, lens position pulses B in the focused state are 948. Thus, the number of pulses A for the measured range data of active range finding system 11 at the object range of 1.3 m is also adjusted to be 948. Next, the variance $|A-B|$ is compared with a preset degree of blur a, and their relative magnitude is judged (step 4 and 5). If the variance is greater than a, the focusing lens is moved in the focusing direction according to measured range data A. That is, focusing mechanism 30 is operated by an amount corresponding to the number of pulses for |A-B|, i.e. the variance from current position data B, so that the focusing lens is moved to the position corresponding to range data measured by the active range finding system (step 6). At that time, pulse generating circuit 33 produces a number of pulses corresponding to the distance to be moved by the lens, and that number is monitored (step 7). The operation of focusing mechanism 30 is terminated when the number of monitored pulses reaches a value equivalent to variance |A-B| (step 8 and 9).

Following the above described operation in the focusing direction, B+/−|A-B| is computed, and the value produced by the computation is stored as the revised current lens position data B (step 10).

As the next step, microcomputer 21 commands passive range finding system 12 to measure the distance so that passive range finding system 12 performs its prefixed measuring operation (step 11) and computes the degree of blur +/−C according to the phase difference X between outputs A1 and A2 shown in FIG. 5 (step 12).

The same passive range measurement operation by passive range finding system 12 is performed also when the variance |A-B| is found to be not greater than the preset degree of blur a at step 5 above. In other words, operation of passive range finding system 12 is actuated in one of two ways, 1) completion of focusing by active range finding system 11, or 2) an initial finding that the variance |A-B| is smaller than preset degree of blur a. In the latter case, operation of active range finding system 11 is bypassed.

Following the range measuring operation by passive range finding system 12, judgment is made as to whether the lens is focused (step 13), and if it is judged to be in a focused state (if degree of blur +/−C is zero), the focusing operation is terminated (step 14). If the focused condition has not yet been reached, focusing mechanism 30 is operated to the extent corresponding to the number of pulses for said degree of blur +/−C (range data measured by passive range finding system 12) to bring the lens into focus (step 15). At this time too, pulse generating circuit 33 produces a number of pulses corresponding to the distance moved by the lens, and that number is monitored (step 16). Operation of focusing mechanism 30 is terminated when the number of monitored pulses reached a figure equivalent to the degree of blur +/−C (step 17 and 18).

Following the above operation in the focusing direction, B+/−C is computed, with the value produced by the computation being stored as the revised data B of the current position of the lens (step 19). It then returns to step 11. Steps 11 and 19 are repeated until the lens is judged to be in focus at step 13.

The degree of blur a, which is used as a standard for judgment in step 5, is set at approximately 500 pulses as shown in the chart. For purposes of explanation, let us suppose that the current lens position data B is 948 pulses in the chart. In this case, if the number of pulses of active range data A is greater than 1462 or smaller than 432, the lens is moved in the focusing direction, first according to active range measurement data A, and then according to passive range measurement. In other words, passive range finding system 12 performs range measurement operation within the scope of maximum of 500 pulses in the + and − directions. Therefore, since passive range data does not become excessively large, it is possible to shorten range computing time and to perform focusing without putting much burden on passive range finding system 12.

Furthermore, since the operational switch from focusing by active range data to focusing by passive range data is executed in accordance with a specified procedural flow, the system is free from hunting for the final focus following switching or selection of operation.

As described as above, according to the present invention, active range finding is performed first, and then, in accordance with its result, passive range finding is performed either immediately or after movement in the focusing direction according to the active range data. Therefore, it is possible to prevent the need for processing an excessive amount of passive range measurement data and to thereby reduce time required to measure the degree of blur as well as to reduce the burden on the computing section of the device, whereby quick focusing is provided.

One skilled in the art will recognize that equivalent elements may be used for those described above. For example, other types of active range finding systems may be substituted for active range finding system 11 without departing from the spirit and scope of the invention. For example, a time-of-transit electro-optical system, which measures the out-and-back transit time of a pulse of light may serve as active range finding system 11. Alternatively, an acoustic range finder, or a radio-frequency range finder may be substituted without departing from the scope of the invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An automatic focusing device comprising:
   an active range finding system;
   a passive range finding system;
   a focusing mechanism;
   said focusing mechanism including means for driving a photographic lens to a focus;
   means for actuating said active range finding system to produce a first range value;
   means to calculate a blur value based on said first range value and determining whether said blur value is less than a predetermined blur amount to actuate said passive range system, and to thereafter bypass said active range finding system;
   means responsive to said first range value to actuate said focusing mechanism; and
   said focusing mechanism being responsive to said passive range finding system whenever said passive range finding system is actuated.

2. Apparatus according to claim 1, wherein said active range finding system is an electo-optical range finding system.

3. Apparatus according to claim 2, wherein said electro-optical range finding system includes:
   a light source;
   a light receiving element;
   means for measuring an angle between an emitted light and a received light; and means for interpreting said angle to produce said first range value.

4. Apparatus according to claim 1, wherein said passive range finding system includes:

means for forming first and second images of an object;

means for determining a variance between said first and second images; and means for interpreting said variance in terms of range to said object.

5. A method for focusing a lens comprising: measuring a range with an active range finding system;

calculating a blur based on said range;

driving a focusing mechanism based on said range in a direction to reduce said blur, if said blur exceeds a predetermined value; and the step of transferring being performed immediately if said blur is initially within said predetermined range.

6. An automatic focusing system comprising:

first means for measuring a range with an active range finding system;

means for calculating a blur based on said range;

means for focusing a lens based on said range in a direction to reduce said blur, if said blur exceeds a predetermined value;

means for measuring a range with a passive range finding system;

means for transferring range measurement from said active range finding system to said passive range finding system if said blur is within said predetermined value; and means for immediately transferring said range measurement if said blur is initially within said predetermined range.

* * * * *